Nov. 28, 1950     F. E. HULL     2,531,626
LANTERN HOLDER FOR BOATS
Filed June 30, 1948

INVENTOR.
FRANK E. HULL,
BY: Harold B. Hood.
ATTORNEY.

Patented Nov. 28, 1950

2,531,626

UNITED STATES PATENT OFFICE 2,531,626

LANTERN HOLDER FOR BOATS

Frank E. Hull, Noblesville, Ind.

Application June 30, 1948, Serial No. 36,020

3 Claims. (Cl. 248—310)

The present invention relates to a mounting bracket constructed and designed to perform certain desirable functions. It has been primarily designed for the purpose of adjustably supporting a gasoline lantern, or the like, upon a small fishing boat; and it has been so illustrated and will be so described; although it will be obvious, as the description proceeds, that the bracket is adaptable to other uses, in that it may be supported upon almost any element capable of being straddled by the clamp, and in that it is capable of supporting almost any element receivable upon the platform. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
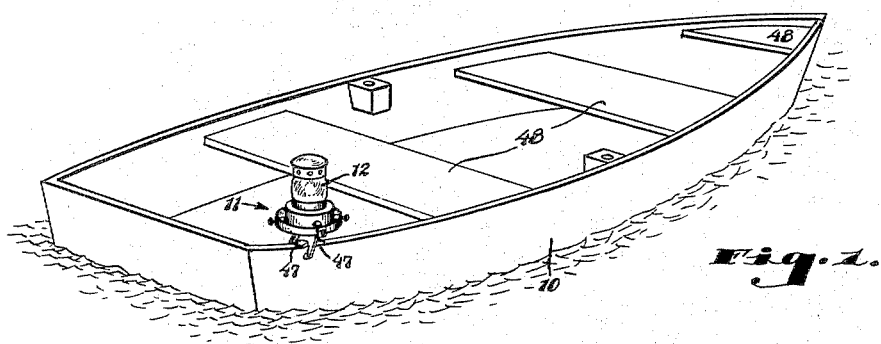
Fig. 1 is a perspective view of a rowboat, showing my mounting bracket supported thereon and carrying a lamp, in the manner in which it is primarily intended to be used.

Referring more particularly to the drawings, it will be seen that I have illustrated a conventional type of rowboat 10 upon one gunwale of which I have shown my mounting bracket, indicated generally by the reference numeral 11, secured to support a gasoline lantern 12 of conventional form.

The mounting bracket of the present invention comprises a generally C-shaped body 13, the stem or main portion 14 of which joins the substantially parallel, depending legs 15 and 16. The leg 15 terminates in a boss 17 provided with a tapped bore 18 therethrough, in which is mounted a clamping screw 19, for rectilinear adjustment toward and away from the corresponding terminal portion of the finger 16. In the illustrated embodiment of the invention, the screw 19 is provided, at its outer end, with a wing portion 20; and at its opposite end, adjacent the finger 16, said screw carries a pad 21, which may preferably be formed of rubber, synthetic rubber, or any other suitable resilient material having a high coefficient of friction. Preferably, the extremity of the finger 16 will fixedly carry a pad 22 which will preferably be formed of material similar to that comprising the pad 21. It will be obvious that, of course, the pads 21 and 22 are not essential; and that, when they are used, either one or both of them may be made of materials other than those above suggested.

Figure 3:
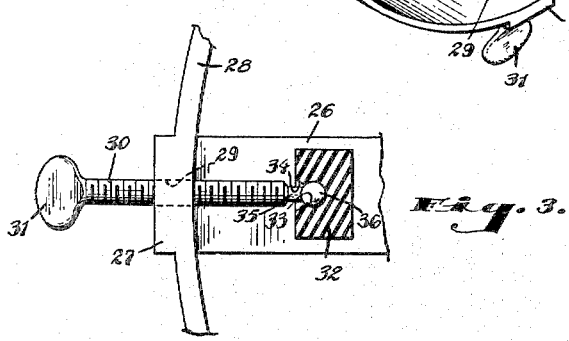
Fig. 3 is an enlarged, fragmentary view of one of the clamping elements associated with the platform, parts being shown in section for clarity of illustration.

That corner 23 of the body 13 adjacent the finger 16 is provided with a transverse perforation adapted to receive a journal element 24, which will preferably be a screw or bolt, to provide a pivotal mounting for a holder means indicated generally by the reference numeral 25. Preferably, said holder will take the form illustrated, in which a spider, comprising a plurality of radiating legs 26, provides a supporting platform for an article, such as the lantern 12, to be carried in the holder. In the illustrated embodiment of the invention, each of the legs 26 terminates in a portion 27 turned out of the general plane of the platform to substantial perpendicularity therewith, all of said terminal portions projecting in a common direction from said plane; and I prefer to provide a continuous rail 28 joining said terminal portions 27 and suitably secured thereto, as by welding or any other suitable fastening means. Each of said terminal portions is penetrated by a tapped bore 29 which continues through the rail 28; and a screw 30 is adjustably mounted in each of said bores for rectilinear movement toward and away from the center of the spider. Preferably, the screws 30 will move on radial lines. In the illustrated embodiment of the invention, the outer end of each screw 30 is provided with a manipulating wing 31, and the inner end of each screw carries a pad 32 which is preferably formed of rubber, or similar material. As is clearly illustrated in Fig. 3, I prefer to form each pad 32 with a spherical socket 33 into which opens a conical recess 34. Each screw 30 preferably terminates in a shank 35 of reduced diameter and a spherical enlargement 36. In the illustrated embodiment of the invention, the material of the pad 32 is so readily distortable that the enlargement 36 can be forced past the reduced apex of the recess 34 and into the spherical socket 33, whereafter the material of the pad will spring back to its original shape, whereby the pad will be suitably held upon the screw 30. This arrangement provides, of course, a ball-and-socket connection between the screw and the pad, whereby the screw is rotatable about its own axis, relative to the pad, and the pad is universally oscillable about axes perpendicular to the axis of the screw. Because of this arrangement, the surfaces of the pad engageable with the lantern 12, or other article to be supported upon the platform, will not be scuffed during tightening and loosening of the screws; and the pads will be enabled to shift relative to the screws to find solid seats against such article.

Preferably, but not necessarily, the pad 21 will be assembled with the screw 19 in the same manner in which the pads 32 are thus assembled with the screws 30.

Projecting from the central portion of the spider, in a direction opposite to the direction of projection of the leg termini 27, is a bifurcated ear 37 adapted to straddle the corner 23 of the body 13; and said ear is provided with perforations adapted to register with the perforation in said body corner, and to receive the pivot element 24, whereby the holder 25 is pivotally mounted upon the body corner 23. A nut 38 will be assembled with the screw 24 to hold the same in position.

Preferably, the corner 23 will be humped in the manner illustrated, whereby the arc through which the holder 25 is oscillable about the pivotal element 24 is somewhat elongated. In the illustrated embodiment of the invention, that arc of adjustment is about 110°; but it is quite desirable that the arc shall not be less than 90° in length.

Near the extremity of one of the legs 26, I have provided an ear 39 located generally in a plane perpendicular to the axis of the pivotal element 24, and projecting out of the plane of the spider in a direction opposite to the direction of projection of the leg termini 27. A link 40 has one end pivotally mounted upon said ear 39 through the medium of a rivet 41, or other suitable fastening means. The link 40 is formed with a longitudinally extending slot 42 therethrough, said slot preferably being closed at its opposite ends. A screw 43 is adjustably mounted in a tapped bore in the body 13 at a point remote from the bore in which is mounted the pivot 24. I prefer to locate the screw 43 in the corner of the body adjacent the finger 15. The shank 44 of the screw 43 loosely traverses the slot 42 in the link 40; and, at a point located near the side of the link 40 remote from the body 13, said screw 43 is provided with a radial enlargement 45. Upon said enlargement 45, I prefer to provide a wing 46. It will be obvious that, when the screw 43 is adjusted to bring the enlargement 45 into engagement with the face of the link 40 adjacent said enlargement, and to press the opposite face of said link frictionally against the body 13, the holder 25 will thereby be held, in any selected position of adjustment, against movement about the axis of the pivot 24; but that, when said screw 43 is backed away to relieve such frictional engagement, said holder may be freely adjusted about said axis, the link 40 sliding relative to the screw 43, during such adjustment, but being restricted, in its line of movement, by the engagement of the shank 44 of said screw in the slot 42.

Figure 2:
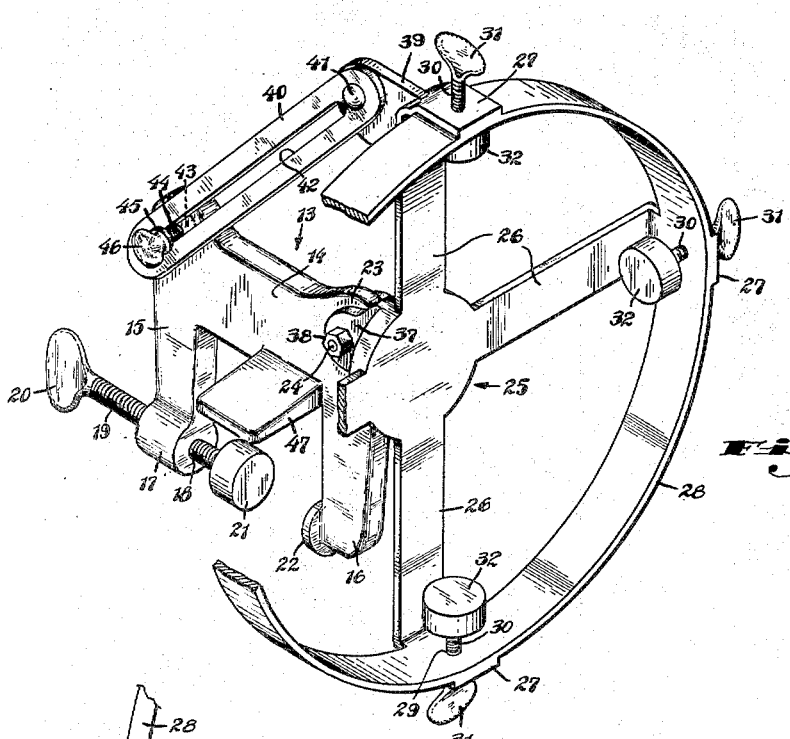
Fig. 2 is a perspective view, upon an enlarged scale, of my mounting bracket in one position of adjustment, parts being broken away for clarity of illustration.

It will be clear, from the above description, that, since the lantern 12 is firmly held in position in the holder 25 by the engagement of the screw-adjustable pads 32 with said lantern, the lantern may be tilted from the position illustrated in Fig. 1 to the position of the holder illustrated in Fig. 2, or to any intermediate position, and may be retained in any selected position between those two extremes. With the bracket 11 mounted on the boat in the manner illustrated in Fig. 1, this means that the lantern may thus be held safely out beyond the edge of the boat, and in a position to throw its rays of light perpendicularly into the water, or at any desired angle to the surface of the water. Thus the user, who may be fishing or gigging, can adjust his lantern to any position which he considers to be optimum, and may leave it in that position, unattended, with perfect assurance that it will be safely held in place.

It will be clear, further, that the lantern, or other object supported in the holder 25, may be mounted at other points on the boat, and held in any desired position of adjustment relative thereto. For instance, with the parts in the relative positions illustrated in Fig. 2, the body 13 might be mounted upon any one of the boat seats 48 and would, in the illustrated position of adjustment, there hold the lantern in vertical position.

In order to guard against accidental oscillation of the bracket about the axis of the screw 19, I prefer to provide the body 13 with a pair of wings 47 (only one of which appears in Fig. 2), rigidly associated with said body and projecting oppositely from the general plane of said body.

I claim as my invention:

1. A mounting bracket of the class described comprising a generally C-shaped body clamp, means carried adjacent one extremity of said body in cooperative relation to the other extremity of said body, holder means pivotally mounted on said body adjacent a corner of said body to swing about an axis substantially perpendicular to the plane of said body, a link connected to said holder means at a point remote from said axis, and means cooperating with said body and said link for retaining said holder means in any selected position of adjustment about said axis, said last-named means comprising a screw threadedly engaging said body and clampingly engageable with said link at selected points in the length of said link.

2. A mounting bracket of the class described comprising a generally C-shaped body, clamp means carried adjacent one extremity of said body in cooperative relation to the other extremity of said body, holder means pivotally mounted on said body adjacent a corner of said body to swing about an axis substantially perpendicular to the plane of said body, a link connected to said holder means at a point remote from said axis and provided with a longitudinally-extending slot, and means cooperating with said body and said link for retaining said holder means in any selected position of adjustment about said axis, said last-named means comprising a screw traversing said slot, threadedly engaging said body, and cooperable with said link to press said link frictionally into contact with said body.

3. The bracket of claim 1 in which said screw has a shank portion loosely engaged in said link slot and further has a radial enlargement, located on the side of said link remote from said body and engageable with said link to clamp said link between said body and said enlargement.

FRANK E. HULL.

REFERENCES CITED

The following references are of record in the file of this patent:

UNITED STATES PATENTS

| Number | Name | Date |
|---|---|---|
| 826,294 | Waldschmidt | July 17, 1906 |
| 935,405 | Rhodes | Sept. 28, 1909 |
| 946,337 | Clear | Jan. 11, 1910 |
| 1,221,658 | Berry | Apr. 3, 1917 |
| 1,437,303 | Hatch | Nov. 28, 1922 |
| 2,008,233 | Walthers | July 16, 1935 |